United States Patent [19]

Kappeler et al.

[11] 3,870,346

[45] Mar. 11, 1975

[54] CONDUIT ELBOW

[75] Inventors: Peter Kappeler; Klaus Uhlig, both of Zurich, Switzerland

[73] Assignee: Brown-Boveri-Sulzer Turbomaschinen Aktiengesellschaft, Zurich, Switzerland

[22] Filed: Nov. 12, 1973

[21] Appl. No.: 415,139

[30] Foreign Application Priority Data
Nov. 14, 1972 Switzerland...................... 16575/72

[52] U.S. Cl....................... 285/47, 138/39, 138/149, 285/179
[51] Int. Cl............................................... F16l 59/14
[58] Field of Search ............ 285/47, 179, 224, 225, 285/DIG. 5; 138/39, 149

[56] References Cited
UNITED STATES PATENTS

| | | | |
|---|---|---|---|
| 2,451,146 | 10/1948 | Baker et al. | 138/149 |
| 2,475,635 | 7/1949 | Parsons | 285/179 X |
| 2,509,503 | 5/1950 | Huyton | 285/47 X |
| 2,599,210 | 6/1952 | Thompson | 138/149 |
| 2,662,553 | 12/1953 | Dimmock | 138/39 X |
| 2,930,407 | 3/1960 | Conley et al. | 138/149 X |
| 2,980,568 | 4/1961 | Kazmierowicz | 138/149 X |
| 3,146,005 | 8/1964 | Peyton | 285/47 |
| 3,369,826 | 2/1968 | Boosey et al. | 285/47 |
| 3,595,275 | 7/1971 | Steans | 138/149 X |
| 3,645,564 | 2/1972 | Corriston | 285/47 |

*Primary Examiner*—Thomas F. Callaghan
*Attorney, Agent, or Firm*—Robert A. Ostmann

[57] ABSTRACT

An elbow section for an insulated conduit comprising an external pipe, an internal pipe, and an insulating layer between the two pipes; a tension strip is looped about the internal pipe and secured to the external pipe as a support for accepting the forces of the flowing medium which act substantially radially outwardly on the internal pipe of the elbow section. Guides allowing to move the strip or the internal pipe only radially outwardly or inwardly along the bend plane of the elbow section are shown too.

9 Claims, 4 Drawing Figures

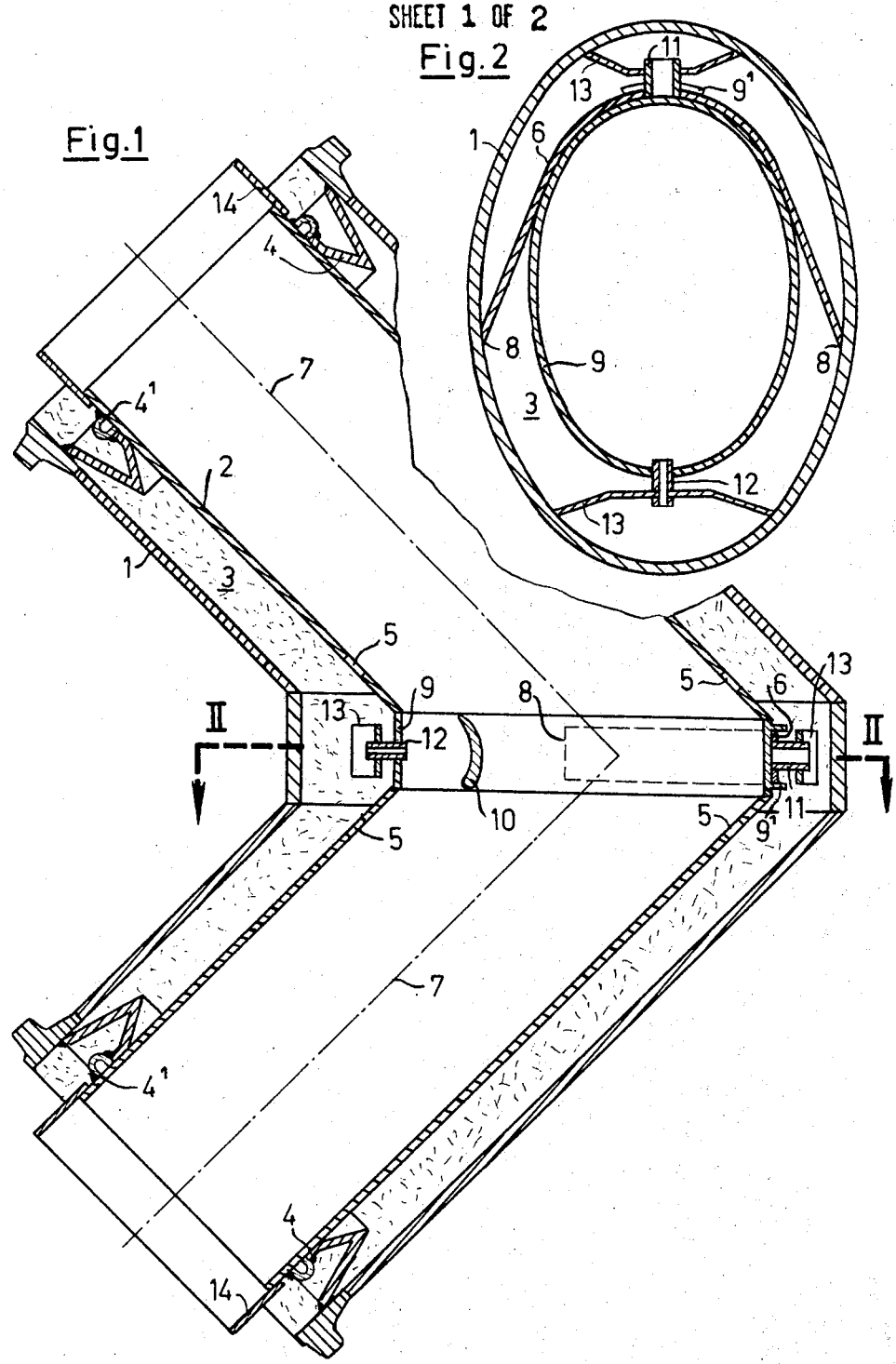

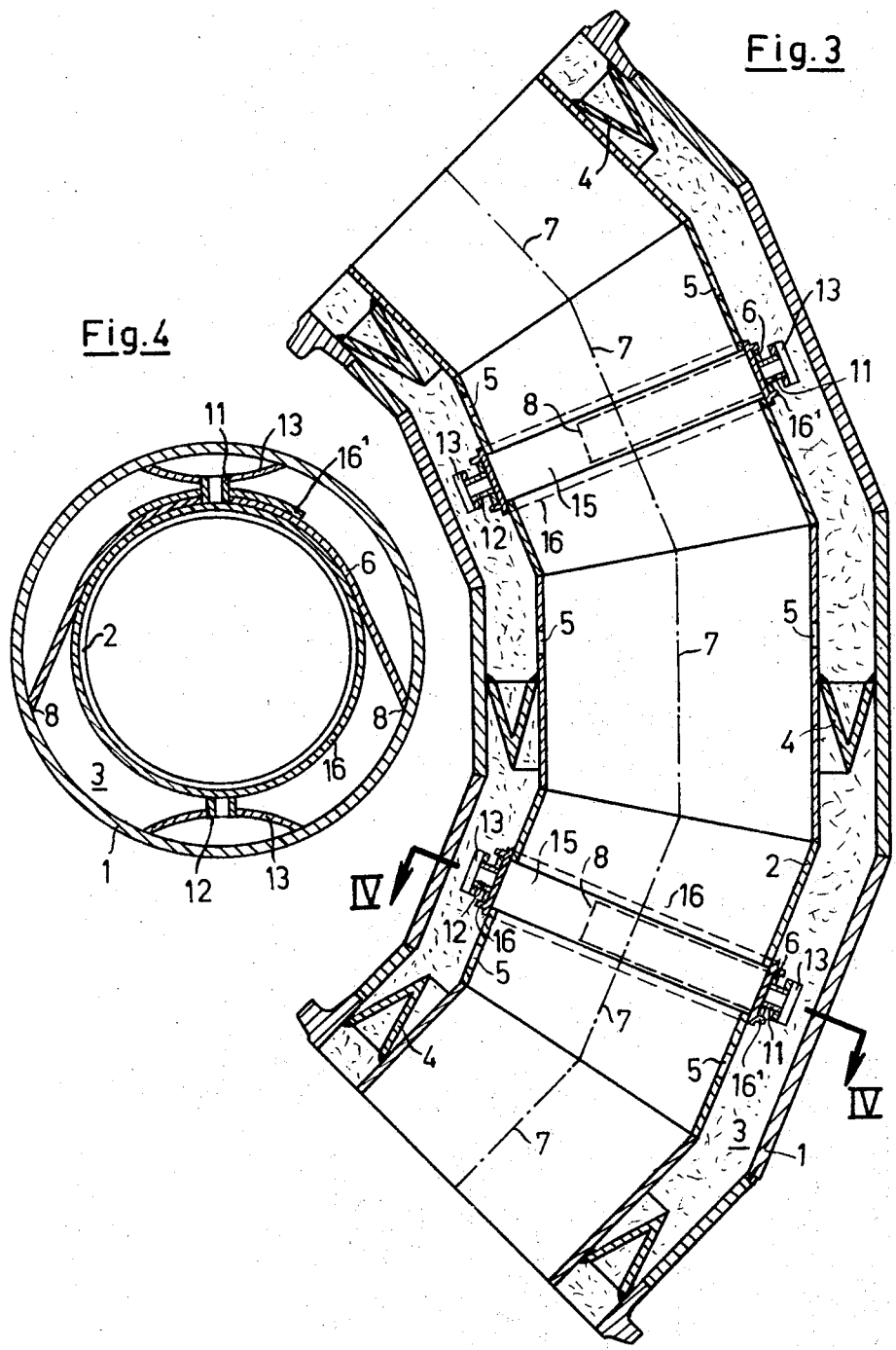

CONDUIT ELBOW

BACKGROUND OF THE INVENTION

The invention relates to an elbow section of an insulated conduit used for a medium under high pressure and at a high temperature which flows at a high speed, the said conduit comprising an external pipe, an internal pipe which is mounted in the external pipe coaxially therewith and which conveys the medium, and an insulating layer between the two pipes.

Conduits of the type described make it possible to accept the high pressure of the medium in a relatively cool zone, that is to say at the external pipe. For pressure equilibrium between the internal pipe and the intermediate space between the two pipes, the internal pipe is provided with apertures. To prevent a parallel flow through the intermediate space and to hold the internal pipe, rings with a conical shape are arranged in the intermediate space. The rings are so dimensioned that they can take up or compensate the temperature-dependent expansion differences between the two pipes.

When designing such a conduit with a large diameter for a medium temperature of 800° to 1000°C and a pressure of approximately 50 atmospheres, problems occur as regards the strength and expansion of the material which cannot be solved with known means more particularly in conduit elbows where there is the complication of the centrifugal energy of the flowing medium.

SUMMARY OF THE INVENTION

The invention has as its object to provide a conduit elbow section of large diameter suitable for a fast-flowing medium the temperature of which is above 800°C and the pressure of which amounts to about 50 atmospheres.

In a conduit section as initially described, the object is achieved according to the invention in that between the internal pipe and the external pipe, as a support for accepting the forces of the flowing medium acting in a substantially radial outward direction in the bend plane of the internal pipe acting on the said internal pipe, there is provided a strip which is secured to the external pipe and is looped about the internal pipe, advantageously in such a manner that this band is a tension band which only partly extends about the internal pipe and is secured at both ends to the external pipe symmetrically relatively to the bend plane of the internal pipe.

It is also advantageous if the strip is so dimensioned and secured that when the length of the strip and the circumference of the two pipes vary when there are temperature variations in the medium, the axis of the internal pipe will remain substantially identical with the axis of the external pipe.

BRIEF DESCRIPTION OF THE DRAWING

The invention will be described in detail and explained hereinafter with reference to simplified drawings showing constructional examples.

In the drawings:

FIG. 1 shows a first constructional example in axial longitudinal section,

FIG. 2 shows the first constructional example but in a section taken on the line II—II of FIG. 1, FIG. 3 shows another constructional example in axial longitudinal section, FIG. 4 shows the other constructional example but in section taken on the line IV—IV of FIG. 3.

DESCRIPTION OF THE PREFERRED EMBODIMENTS

The conduit elbow of an insulated conduit of large diameter for a medium at high temperature and under high pressure which flows at a high speed comprises an external pipe 1 and an internal pipe 2 within the said external pipe 1. The internal pipe 2 is mounted in the external pipe 1 coaxially therewith. For holding the internal pipe 2 conical rings 4 are provided in the intermediate space 3 between the two pipes 1 and 2. The intermediate space 3 is filled with an insulating layer consisting of an insulating material. The rings 4 are so designed and dimensioned that they can take up or compensate the temperature-dependent expansion differences between the two pipes 1 and 2. The rings 4 also prevent a parallel flow of medium through the intermediate space 3 parallel to the internal pipe 2. This flow through the intermediate space 3 would otherwise take place as a result of apertures 5 which are provided in the internal pipe 2 to establish a pressure equilibrium relatively to the intermediate space 3.

As a support between the internal pipe 2 and the external pipe 1, for receiving the forces of the flowing medium acting substantially radially outwardly in the bend plane or plane of curvature of the internal pipe 2, there is provided a strip 6 which is secured to the external pipe 1 and is looped about the internal pipe 2. The bend plane of the internal pipe is defined by the pipe axes 7 of the conduit elbow. The strip 6 is constructed as a tension strip which extends only partly about the internal pipe 2. The strip 6 is secured at both ends symmetrically with respect to the bend plane of the internal pipe 2 at the points 8 on the external pipe 1.

The strip 6 is secured and dimensioned in such a manner that when there are variations in the length of the strip 6 and the circumference of the two pipes 1 and 2 in the event of temperature variations in the medium, the axis 7 of the internal pipe 2 remains substantially identical with the axis of the external pipe 1. The strip 6 is a single strip of sheet metal. But it is also possible for the strip 6 to be composed of several sheet metal layers.

An axial portion 9 of the internal pipe 2 which is secured by means of the strip 6 to the external pipe 1 is used as a means for supporting the row of blades guiding the flow of medium. In a simplified manner, the illustration shows only one of these blades, a blade 10 used for guiding the flow of the medium. A guide 11 and a guide 12 are situated in the bend plane of the internal pipe 2. The guides 11 and 12 are each secured on the external pipe 1 by means of a spring leaf 13 extending at right angles to the plane of bend of the internal pipe 2. On the other hand the guide 11 is connected with the strip 6 and the guide 12 with the axial portion 9 of the internal pipe 2. The axial portion 9 is provided at the place where the strip 6 is connected with the guide 11 with guide strips 9¹ which abut on the strip 6 at both sides. consequently, the strip 6 and the portion 9 or the internal pipe 2 can only move radially upwards or inwards along the bend plane of the internal pipe 2, the movements in the direction of the axes 7 of the internal pipe 2 being prevented.

The internal pipe 2, however, can extend its length along the axis 7 in dependence on temperature in both directions at both sides away from the guides 11 and 12 or can shorten its length back towards these. For this reason the internal pipe 2 is provided at both ends with rings 14 for connection to the other parts (not shown) of the conduit. The conical rings 4 are secured fixedly on the external pipe 1. But the internal pipe 2 is mounted to be capable of sliding in the rings 4. Compensating elements $4^1$ are arranged between the internal pipe 2 and the rings 4.

A segment elbow section according to the invention is shown in FIG. 3 and 4 as another constructional example. Both the external pipe 1 and the internal pipe 2 in this constructional form are connected fixedly with the rings 4. For longitudinal expansion compensation the internal pipe 2 is sub-divided in the region where the strip 6 is arranged by means of a gap 15 into the axial portions and provided with a sliding annular sleeve 16 covering the gap 15. The strip 6 extends about the annular sleeve 16. The annular sleeve 16 like the axial portion 9 in FIG. 1 and FIG. 2 is provided with guide strips $16^1$ and secured by means of guides 12 and 11 and spring leaves 13 on the external pipe 1.

We claim:

1. An elbow section for an insulated conduit for a high pressure, high temperature medium which flows at high speed, the conduit including coaxial external and internal pipes spaced from each other by an intermediate layer of insulating material and the internal pipe containing apertures for equalizing the pressures acting on its inside and outside surfaces and thereby relieving it from pressure loading, the conduit having a longitudinal axis which changes direction in a bend plane in the region of the elbow section, and characterized by a support strip which is secured to the external pipe and is looped about a portion of the internal pipe so that it accepts and transmits to the external pipe the forces of the flowing medium which act radially outward on the internal pipe in the bend plane as a result of said direction change; and by guide means centered in the bend plane, reacting between the two pipes, and serving to allow movement of said portion of the internal pipe relatively to the external pipe only in the radial direction in the bend plane.

2. An elbow section as defined in claim 1 in which the support strip is so arranged that it is loaded in tension by said forces it transmits to the external pipe.

3. An elbow section as defined in claim 2 in which the support strip has opposite ends which are secured to the external pipe at opposite sides of the bend plane; and said strip extends around only a portion of the internal pipe located radially outward of the conduit axis in the bend plane.

4. An elbow section as defined in claim 3 in which the ends of the strip are connected to the external pipe at locations arranged symmetrically with respect to the bend plane.

5. An elbow section as defined in claim 1 in which the support strip is looped about a portion of the internal pipe which supports a row of blades arranged to guide the flowing medium through said direction change.

6. An elbow section as defined in claim 1 in which the guide means includes a guide member fixed to the internal pipe.

7. An elbow section as defined in claim 1 in which the guide means includes a guide member fixed to the support strip; and means preventing relative movement between said portion of the internal pipe and the support strip in the direction of the conduit axis.

8. An elbow section as defined in claim 1 in which the support strip is looped about the internal pipe in a region wherein that pipe comprises two axially spaced pipe parts, and a sliding sleeve which is mounted on those parts and spans the gap between them, the sleeve being engaged by the support strip and being constrained to radial movement by the guide means.

9. An elbow section as defined in claim 1 in which there are two of said guide means located, respectively, at opposite sides of the internal pipe.

* * * * *